United States Patent [19]

Vogel

[11] Patent Number: 5,253,066
[45] Date of Patent: Oct. 12, 1993

[54] TV RECORDING AND VIEWING CONTROL SYSTEM

[76] Inventor: Peter S. Vogel, 608 N. Sierra Dr., Beverly Hills, Calif. 90210

[21] Appl. No.: 793,436
[22] PCT Filed: May 30, 1990
[86] PCT No.: PCT/AU90/00226
    § 371 Date: Nov. 5, 1991
    § 102(e) Date: Nov. 5, 1991
[87] PCT Pub. No.: WO90/15507
    PCT Pub. Date: Dec. 13, 1990

[30] Foreign Application Priority Data

Jun. 1, 1990 [AU] Australia .................. PJ4500

[51] Int. Cl.⁵ .................................. H04N 7/087
[52] U.S. Cl. ........................ 358/188; 358/142; 358/349; 358/194.1
[58] Field of Search ............ 358/142, 188, 908, 194.1, 358/147, 183, 191.1, 86, 84, 349; 455/186.1, 186.2, 6.2, 6.3; 380/20

[56] References Cited

U.S. PATENT DOCUMENTS

| | | | |
|---|---|---|---|
| 4,355,415 | 10/1982 | George et al. | 380/20 |
| 4,605,964 | 8/1986 | Chard | 358/147 |
| 4,718,107 | 1/1988 | Hayes | 358/349 |
| 4,857,999 | 8/1989 | Welsh | 358/84 |
| 4,908,707 | 3/1990 | Kinghorn | 358/147 |
| 4,930,158 | 5/1990 | Vogel | 380/20 |
| 4,959,720 | 9/1990 | Duffield et al. | 358/194.1 |
| 4,977,455 | 12/1990 | Young | 358/147 |
| 5,109,279 | 4/1992 | Ando | 358/147 |
| 5,134,719 | 7/1992 | Mankovitz | 455/186.1 |
| 5,200,822 | 4/1993 | Brenfin et al. | 358/142 |

FOREIGN PATENT DOCUMENTS

0373297 6/1990 European Pat. Off. .
0004507 6/1988 PCT Int'l Appl. .

Primary Examiner—Victor R. Kostak
Assistant Examiner—Jeffrey S. Murrell

[57] ABSTRACT

A signal representative of a television program guide, a signal indicating which program is currently being viewed or recorded and a signal indicating the class of program being viewed or recorded are received at the point of reception of a television program signal. The program guide signal is used to cause a program guide to be displayed on a television screen. A viewer selects one or more programs to be recorded or viewed from the displayed guide and selects a set of classifications that are to be permitted. While the received program indicating signal indicates that the current program is one of the selected programs and the received classifying signal indicates that the current program is of a permitted classification, recording or viewing of the program is enabled. A further extension of the invention causes the program identifying signal to be recorded on a video recording along with the program so that on replay the recording can visually be identified.

21 Claims, 6 Drawing Sheets

TV RECORDING AND VIEWING CONTROL SYSTEM

TECHNICAL FIELD

The present invention relates to means for and methods of controlling video appliances, such as video cassette recorders or television receivers, so that selected television programs are viewed or recorded.

BACKGROUND ART

With the increasing use of video cassette recorders (VCRs) in the home, VCRs are being increasingly used for recording broadcast programs for later replay and viewing. Many VCRs are equipped with timing means for starting and stopping recording of programs at times selected by the user. To take advantage of this ability, the user must consult a television schedule, select the programs to be recorded, and enter into the VCR's memory the start time and end time or duration of the selected programs, and channel to be recorded. In some cases this process can be complicated and error-prone. There is a great need for convenient ways of selecting programs to be recorded.

In an attempt to address this problem, some manufacturers have equipped VCRs with bar-code reading wands. Users can pass the wand over a bar-code printed on the television schedule which identifies the channel and time of the selected program. This information is used to set the timing means of the VCR. Another variation on this concept involves use of a sheet of times, dates and channels bearing the associated bar codes. In this case, the user must scan the appropriate bar code on this sheet for time, date and channel corresponding to programs selected for recording.

While these prior-art schemes have somewhat alleviated the difficulties, programming VCRs for recording is still error prone and inconvenient. Attempts have been made to provide improved programming by providing a device which accepts a machine-readable version of the television schedule via the medium of magnetic card, tape or similar means, the user being then offered a display of available programs from which to select. Although this arrangement does represent an improvement over prior schemes, it suffers the disadvantage that the user must obtain the medium on which the schedule is distributed, which may be inconvenient. The media cost and cost of the reading device is also considerable. Another shortcoming of prior-art schemes is that they rely on time-of-day information for starting and stopping recording, with the result that unwanted material can be recorded, or part of the wanted program missed, in cases where actual broadcast times differ from scheduled times. It is also not possible using such schemes to control recording with great precision, with the result that selective recording, as required for example for eliminating advertisements from recordings, is not possible.

DISCLOSURE OF INVENTION

The present invention is directed towards providing new and useful alternatives to known arrangements for controlling video appliances so that selected programs can be viewed or recorded. As well as making selection simple, fast and accurate, the present invention offers a number of other benefits not hitherto obtainable.

According to the present invention there is provided a method of selecting television programs to be recorded including the steps of receiving a first signal conveying data representative of a television programming schedule, decoding said received signals, displaying the resulting decoded schedule information, selecting one or more of programs displayed in said schedule as programs to be recorded, receiving a second signal identifying for each television channel the program being currently broadcast, decoding said second signal, and controlling recording of the selected programs according to the selection from the schedule and the content of said decoded second signal.

According to another aspect of the present invention there is provided a method of selecting television programs to be viewed including the steps of receiving a first signal conveying data representative of a television programming schedule, decoding said received signals, displaying the resulting decoded schedule information, identifying a number of programs displayed in said schedule as programs to be recorded, receiving a second signal identifying for each television channel the program being currently broadcast, decoding said second signal, and enabling viewing of the selected programs according to the programs selected from the schedule as those to be viewed and the content of said decoded second signal.

According to another useful extension of this inventive concept, there is provided a television program recording identifying method comprising the steps of receiving a first signal representative of the name of a television program being broadcast, receiving a second signal being a television broadcast, and recording said first signal while simultaneously recording said second signal.

In another aspect, the invention consists in a television program recording selector including a receiver adapted to receive a first signal conveying data representative of a television programming schedule, means to decode said received signals, means for displaying the resulting decoded schedule information, means for selecting a number of programs displayed in said schedule as programs to be recorded, means for receiving a second signal identifying for each television channel the program being currently broadcast, means for decoding said second signal, and means for controlling recording of the selected programs according to the programs identified as those to be recorded and the content of said decoded second signal.

In another aspect, the invention consists in a television program viewing selector including a receiver adapted to receive a first signal conveying data representative of a television programming schedule, means to decode said received signal, means for displaying the resulting decoded schedule information, means for selecting a number of programs displayed in said schedule as programs to be viewed, means for receiving a second signal identifying for each television channel the program being currently broadcast, means for decoding said second signal, and means for controlling viewing of the identified programs according to the programs selected as those to be viewed and the content of said decoded second signal.

According to another useful extension of this inventive concept, there is provided a television program recorder comprising means for receiving an identifying signal representative of the name of a television program being broadcast, recording means adapted to record said signal while simultaneously recording the television program being broadcast, replay means for simultaneously replaying said identifying signal and said program, and means for displaying said identifying signal in the form of text.

BRIEF DESCRIPTION OF THE DRAWINGS

A particular embodiment of the invention will now be described with reference to the drawings in which.

MODE FOR CARRYING OUT THE INVENTION

Figure 1:
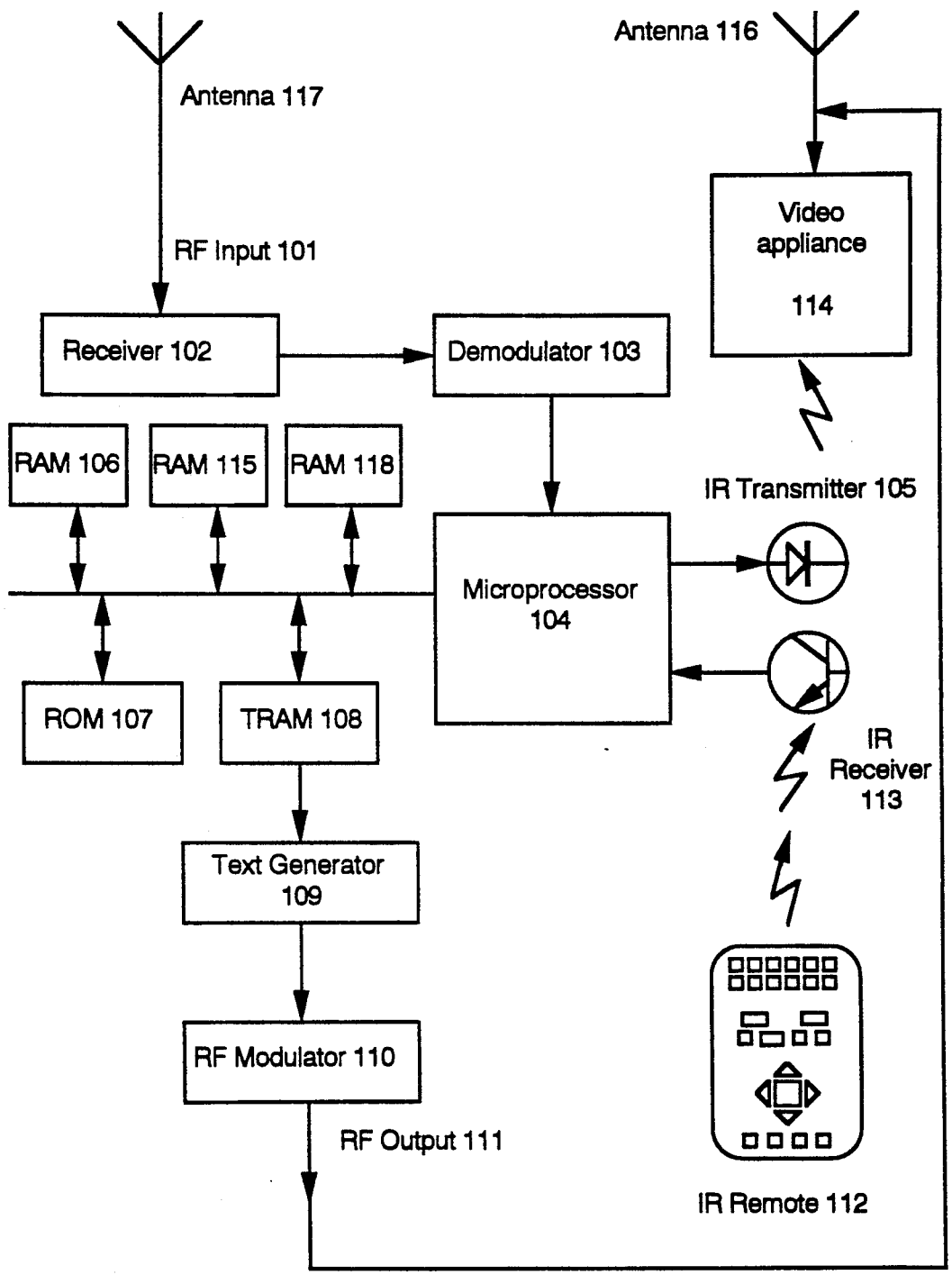
FIG. 1 is a block diagram of a television program selector according to the invention.

As seen in FIG. 1, an embodiment of the invention is provided for use in conjunction with video cassette recorders (VCRs). this embodiment takes the form of a device which communicates with the VCR via an infrared (IR) control signal, this signal being similar to the control signal used by the hand-held remote control of conventional VCRs. This embodiment of the invention is in turn controlled by a hand-held remote control. Using this control means, the invention allows the user to control the usual functions of a VCR, such as recording or playing a tape, as well as the novel functions provided by this invention. This arrangement is particularly beneficial as it can be used with a wide range of VCRs without modification of the VCR. Referring to FIG. 1, RF input 101 is derived from the television antenna being used to receive off-air programs antenna 116 or a separate antenna 117, and comprises a signal modulated with data relating to the television schedule and the programs currently being broadcast. This signal is received by receiver 102, and fed to demodulator 103 which provides as an output digital data which is fed to an input of microprocessor 104.

Microprocessor 104 executes program instructions stored in read-only-memory ROM 107, and is responsible for all control and user-interface functions of this embodiment of the invention. Received data comprises two main types: periodic data and real-time data. Periodic data comprises the television schedule for the current day and future days, including the name of each program, its scheduled start time, the channel on which it is to be broadcast, and a classification (such as whether or not it is suitable for viewing by children). The periodic data is transmitted from a remote source, such as the television broadcast station or a separate transmitting station, at infrequent intervals, say once every hour. Real-time data comprises information which identifies which program is currently being broadcast on each channel, including the program classification. This data is transmitted from the remote source as soon as possible after a charge of program on any channel, and is then repeated occasionally, say every 10 seconds, until another change of program occurs.

On receipt of program schedule data, microprocessor 104 stores the data in random access memory RAM 106.

On receipt of a command from the user requesting information, such as the program schedule, microprocessor 104 retrieves the relevant data from RAM 106, formats it for display and stores it in text random access memory TRAM 108.

Text generator 109 accesses the data stored in TRAM 108 and generates a video raster signal which when conveyed to a television receiver via RF modulator 110 and RF output 111 causes the text to be displayed on the screen of video appliance 114 which may be a television receiver or receiver/recorder.

IR receiver 113 receives infra-red control signals from IR remote 112, which for convenience is a hand-held control device. IR remote 112 includes a switch array which provides means for users to issue instructions to microprocessor 104, and in this embodiment is constructed as shown in FIG. 2, so as to offer most conveniently the functions described below.

IR transmitter 105 is an infra-red emitting diode which is used to control a VCR, via the infra-red remote control channel commonly used with VCRs. IR transmitter 105 is pulsed under control of microprocessor 104 to generate control data which controls the operation of the VCR, for example, by issuing a PAUSE command or a RECORD command.

Figure 2:
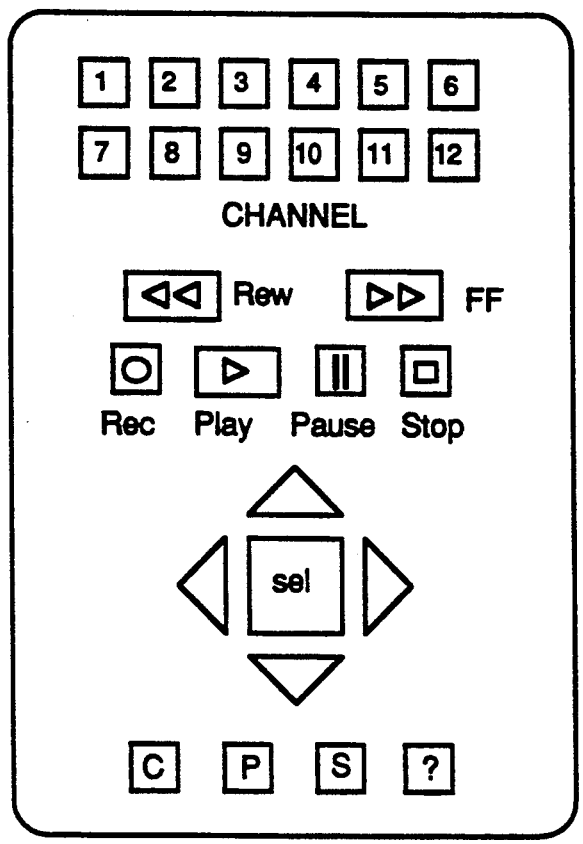
FIG. 2 shows the control panel of this embodiment

Referring now to FIG. 2, the layout of switches of the user control keyboard can be seen. Twelve switches labelled "CHANNEL" are used to select one of 12 channels to be viewed. The switches "Rew", "FF", "Rec", "Play", "Pause" and "Stop" the rewind, fast forward, record, play, pause and stop functions of the VCR in the usual manner. The switch "sel" is used to select a menu option. The four triangular switches surrounding the "sel" switch cause movement of the cursor on a menu display in one of the four directions indicated. The switches "C", "P", "S" and "?" are used to initiate the classification, program, status and QUERY functions respectively. The operation of these four functions will now be described.

CLASSIFICATION. Pressing this button causes a display such as that shown in FIG. 4 to appear on the television screen. This display is known as the STATUS menu. The CLASSIFICATION function relates to the text in the left-hand column of the display, headed "ENABLE". The letters shown in the column under ENABLE represent the following classifications:

C: Suitable for children
G: General viewing
A: Adult
R: Restricted
AD: Advertisement or other non-program material The boxes adjacent to each classification letter indicate whether each classification is enabled, a check mark indicating enabled, and a cross indicating prohibited. The selections of classifications to be prohibited are stored in RAM 118. If a program of a classification which is prohibited is received, the invention causes the video recorder to pause, preventing recording. If desired, viewing of programs bearing prohibited classification can also be inhibited by the invention causing the channel selector of the receiver or VCR to select the output of the invention, rather than the channel of the program. It is also possible to provide an alarm function to alert viewers that a particular program is about to start. For example, the invention can be used to turn on the television receiver when a preselected broadcast starts, and to sound an alarm five minutes beforehand. To enable or prohibit a particular classification, the user pushes the C button, which causes the STATUS display to appear with the cursor positioned on one of the indicator boxes. The desired classification is then selected by moving the cursor up or down using the up or down pointing triangular keys. The enable status of the cursored classification can be changed by pressing the "sel" button.

Another box in the ENABLE column labelled "LOCK" enables a security function which prevents changing the status of classifications unless a personal identity number, known only to authorised persons, is entered first.

Figures 3, 4:
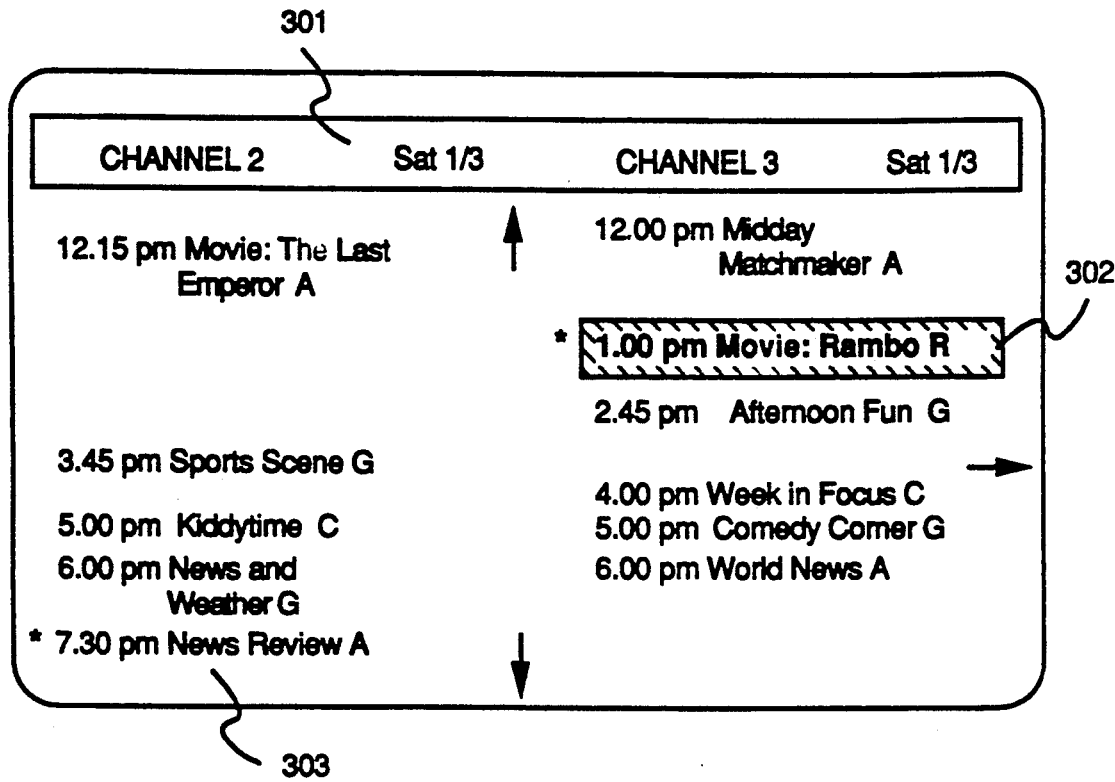
FIG. 3 shows an example of the schedule menu display of this embodiment.
FIG. 4 shows an example of the status menu display of this embodiment.

PROGRAM. Pressing this button causes a display such as that of FIG. 3 to be displayed. This display is known as the PROGRAM menu, and shows a list of scheduled programs for each available channel. Channel indicator box 301 shows the date and channel to which each column of schedule information relates. Each entry in the schedule shows the scheduled time of broadcast, title and censorship classification. A cursor is used to highlight one schedule item at a time. The cursor can be moved up, down, right or left using the triangular switches. By way of example, in FIG. 3 item 302 is shown as cursored. A program can be selected for recording by pressing the "sel" switch when the desired item is cursored. An asterisk is displayed next to each item selected for recording, as shown in the example of item 303 in FIG. 3. The selected program items are stored in RAM 115. As it will generally not be possible to fit all the schedule information on the display, this embodiment of the invention is arranged so that the program menu scrolls in both axes. This scrolling occurs if the cursor movement switches are pressed and the cursor is at the limit of movement in the corresponding direction. As seen in FIG. 3, arrows appear on the display indicating that further information can be accessed by scrolling the display further in the direction of the arrow.

STATUS. Pressing this button causes the status menu to be shown. The column of this display under the heading "CURRENT" shows details of the program currently being broadcast on the channel selected for viewing. The information displayed includes the scheduled time of broadcast, date, channel, title and classification. The status menu also shows a list of programs selected for recording. The downward-pointing arrow below the list shown in the example of FIG. 4 indicates that there are more items selected for recording, and these can be accessed by scrolling the display using the downward-pointing cursor control switch.

QUERY. If this switch is pressed while a menu is being displayed, details of the currently cursored broadcast are displayed. For example, if a movie is cursored and the "?" switch is pressed, a description of the movie is displayed, the text of this description having been previously conveyed from the remote transmitter as part of the schedule information. If the "?" switch is pressed when no menu is being displayed, details of the program currently being received are displayed.

As well as responding as described above to commands requiring text display as described above, the microprocessor performs a number of other major functions.

These functions are now described with reference to FIG. 1.

VCR CONTROL. Certain commands received by IR receiver 113, in particular those which effect the usual VCR functions such as play, stop, channel change, are passed on to the VCR being controlled. Because control codes used by different models of VCRs are not standardised, the command code required by the VCR will in general not be the same as that generated by the corresponding button of IR remote 112. To permit use of the invention with a wide range of VCRs, data representing the control codes required by the particular VCR in use is stored within the ROM or RAM of the invention, so that when a VCR control command is to be issued, the corresponding code can be looked up and transmitted. Microprocessor 104 maintains a VCR status table in RAM 106, which stores data such as television channel currently being received and VCR transport status such as stopped, recording or spooling. This status table is updated each time a VCR control command is issued.

SCHEDULE UPDATE. Data conveying schedule information is periodically received by receiver 102. This information is stored in RAM 106. When the available memory is full, the oldest schedule information is discarded.

CURRENT PROGRAM IDENTIFICATION. Whenever a change of program occurs on one of the available television channels, an identifying signal is received by receiver 102. This signal includes data identifying the channel concerned, the classification of the program, the name of the program, and such other identifying information as may be desired. When an identifying signal is recognised by microprocessor 104, it takes different action depending on the current status of the VCR (ascertained by reference to the status table in memory) and the instructions previously issued by the user. The VCR status must be taken into account because different commands must be generated depending on what the VCR is doing at that moment. For example, if advertisements have been prohibited (using the status display) and the received identifying signal indicates commencement of an advertisement, the microprocessor must ascertain whether the channel indicated by the identifying signal is the channel currently selected by the VCR's tuner. Because any channel change commands previously issued to the VCR by the user have been forwarded to the VCR by the invention, the identity of the currently-selected channel is always available to the microprocessor. In this example, if the VCR is tuned to the channel on which a prohibited advertisement is in progress, further reference is made to the status table to ascertain whether the VCR is recording. If it is, a suitable "pause" command is issued. When an identifying signal indicates that the program being recorded has resumed, the status is again checked before issuing a "resume recording" command, in case the user has issued a command which has changed the status of the VCR in the meantime. Another example of action taken on receipt of a current program identification signal is comparison to a list of programs selected from the program guide display for recording. If the current program is identified as one selected for recording, the VCR status is read and, depending on the current status, the commands required to start recording are issued. For example, if the VCR is currently tuned to a different channel, "channel up" or "channel down" commands are issued as required to select the channel to be recorded. Other commands, such as "power on" may also be issued if required before the "record" command is issued.

The functions of this embodiment of the invention are implemented by suitable software stored in ROM 107 and executed by microprocessor 104. The program required to achieve this can be effectively realised in many different ways well known to those skilled in the art.

The foregoing describes only one embodiment of the present invention, and changes, obvious to those skilled in the art, can be made without departing from the scope of the invention.

For example, whereas the exemplary embodiment described above takes the form of apparatus separate from the video recording or viewing apparatus, the invention can also be practised by including suitable means within a video recorder, television receiver or other appliance. In such a case, control of the receiving or recording appliance can be effected by suitable connection to the control means of the appliance, rather than the infra-red control path used by the embodiment above.

It will also be understood that the functions offered to the user according to the embodiment described above are given by way of example only, and other functions can be provided without departing from the scope of the invention. For example, whereas the embodiment described causes recording or viewing of the classifications not enabled to be inhibited, it is envisaged that other options can be provided. For example, the user can instruct that advertisements be muted, in which case the invention is arranged so that on receipt of data indicating that an advertisement is being received on the channel being viewed, a command is issued to the television receiver to cause muting of the sound signal, the sound being re-enabled on resumption of program.

It is also envisaged that the user controls of the invention can be incorporated with control of other appliances, for example, by incorporating the function switches of the invention into an infrared remote control handpiece of another appliance, such as a VCR or television receiver.

Figure 5:
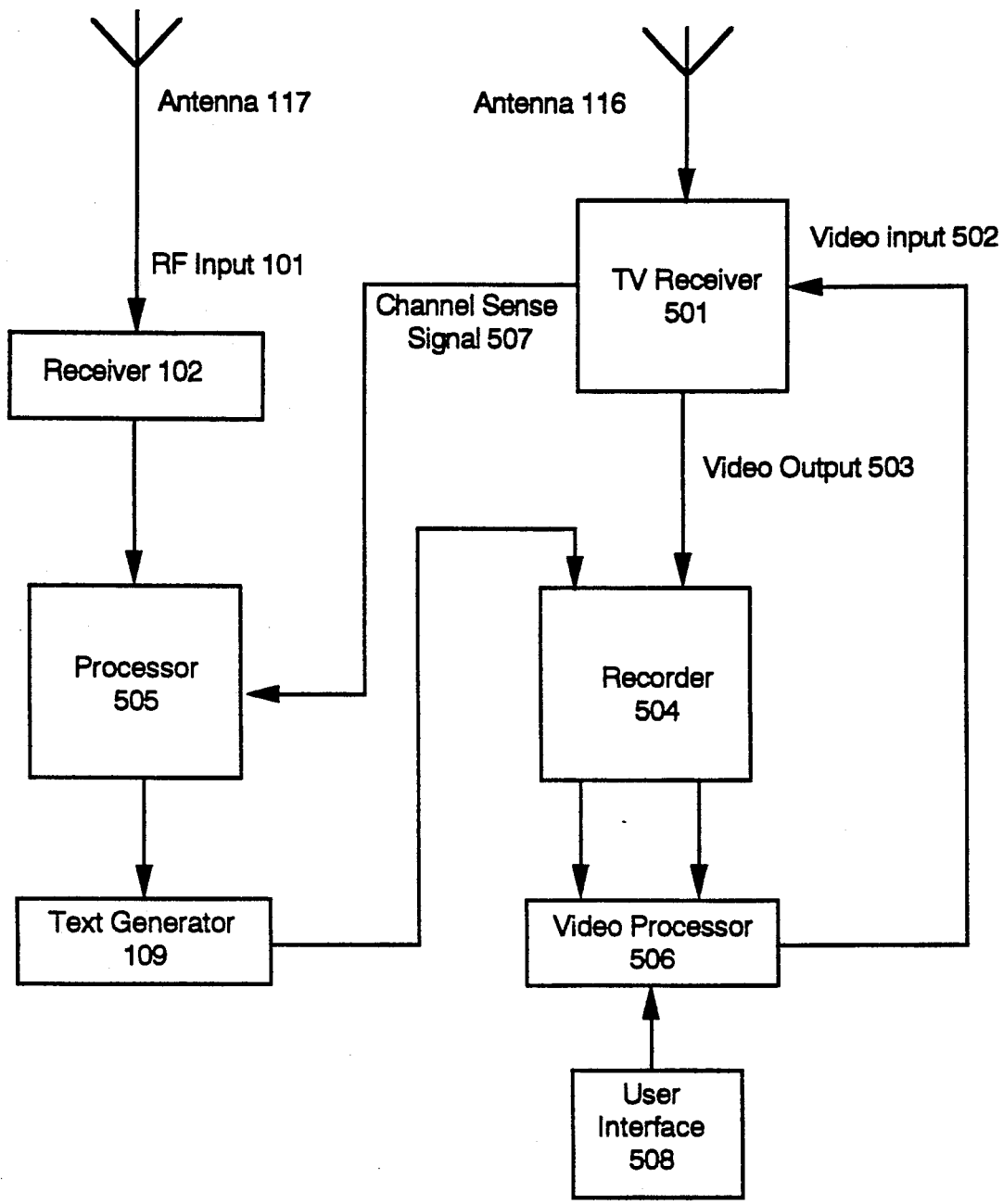
FIG. 5 is an embodiment of the invention adapted to label video recordings.

According to a further extension of the invention, program identification data within the invention can be used to label tape recordings, using the identifying data received by the data receiver of the invention to provide the labelling information. For example, the invention can be arranged to place a suitable code in the vertical interval of the video recording so that the name of a program is recorded as the program is recorded. This extension permits programs recorded on a tape to be identified by name on replay, as well as facilitating automatic location of a program by name. An embodiment of this aspect of the invention is shown in FIG. 5. Processor 505 receives identifying signals and a channel sense signal 507 and determines the channel being received as described above in relation to FIG. 1. Recorder 504 receives two record signal inputs; the video output 503 of TV receiver 501 and the output of text generator 109. These signals are recorded simultaneously using any suitable techniques. For example, the text signal can be recorded in the vertical interval of the video signal. When the tape is replayed, the two signals are processed by video processor 506 to feed a video signal to video input 502 of receiver 506. A user interface 508 connected to video processor 506 allows the user to select whether the TV displays replayed program, the program name, or both.

Figure 7:
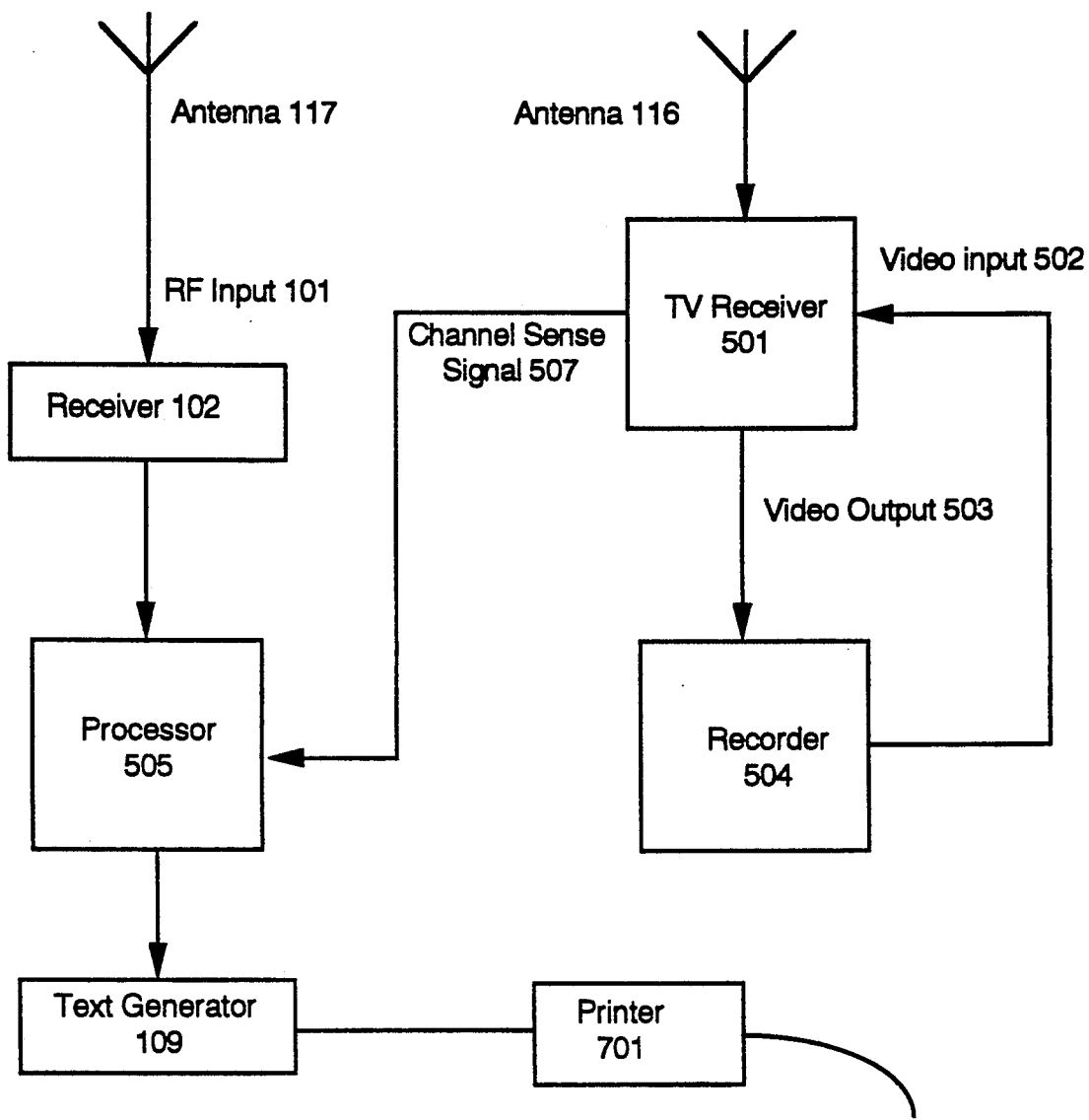
FIG. 7 is another embodiment of the invention adapted to label video recordings.

The invention can be further adapted to cause the name of a program to be printed legibly, for example on the casing of the video cassette on which the corresponding program is recorded. This can be achieved in practise using the arrangement shown in FIG. 7 in which the output of text generator 109 feeds thermal or impact or other printing means 701. The name of the program recorded is determined as described previously and printed as alpha-numeric characters on the outside of the video cassette, or onto another medium such as an adhesive label which can be subsequently affixed to the enclosure of the recording or into a catalogue or elsewhere.

Whereas in the exemplary embodiment recording of selected programs is initiated and terminated according to correspondence between the name of a selected program and the name of the currently-broadcast program being received, it is also possible to control recording according to the scheduled time of broadcast.

It will also be understood by those skilled in the art that the display functions and other details of the invention described in relation to the embodiment above are given by way of example only, and that changes to the features offered and particularly to the means of interaction with the user can be made without departing from the scope and spirit of the invention. For example, whereas the television display is used to display information for user inspection and switches are used for user control, the invention can be practised using any other suitable display means and control means, such as a liquid crystal display or touch-activated screen. The screen formats shown in the drawings herein are given by way of example only and should also not be construed as limiting the scope of the invention. Furthermore, whereas the exemplary embodiment provides a video-modulated RF output which is selected for viewing of menus, it is possible to arrange the invention so that the requested information is overlaid on the picture of the program being viewed.

It is also envisaged that the method of transmission of data to the invention from a remote station need not be by means of a radio transmission as used in the exemplary embodiment above. For example, the data could be conveyed to the invention by means of a signal embedded in the television broadcast, such as a special-purpose subcarrier or vertical-interval signal, or by cable or fibre-optic connection, or by data transmitted by optical signalling via a designated area of a television picture, or by telephone line, or by any other data transmission means. It is also possible to transmit the non-realtime data by means of a portable recording medium such as floppy disk or optically marked card. It is envisaged that the data used by the invention can originate from any source without departing from the scope of the invention. For example, the data can originate from a central monitoring station, as shown in FIG. 6.

Figure 6:
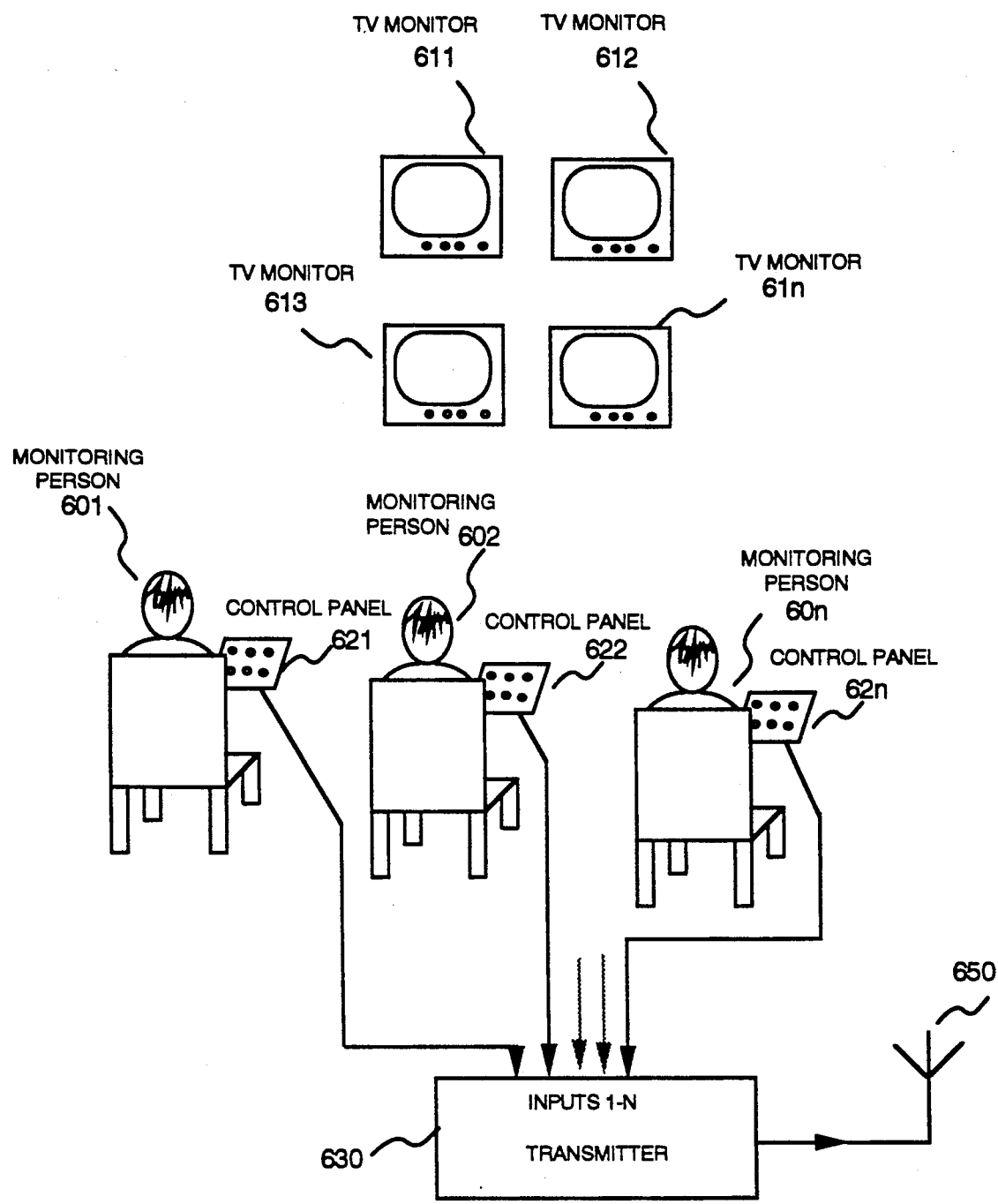
FIG. 6 shows the transmission of data to the invention from a monitoring station.

Referring to FIG. 6, a number of monitoring persons 601, 602 . . . 60n monitor all television channels using TV monitors 611, 612, 613 . . . 61n and transmits identifying information to the invention via control panels 621, 622 . . . 62n, transmitter 630 and antenna 650.

Alternatively, program information can be automatically generated using a data-base in which detailed programming data is stored in advance.

I claim:

1. A method of controlling a video appliance comprising the steps of:
    receiving a first signal representative of a television program schedule, a second signal indicating which television program is currently being received and a third signal indicating the class of program being received;

converting said first signal into a display of text representative of said television program schedule;

nominating a subset of items of said displayed text as items to be permitted and selecting a set of classifications which are to be prohibited; and, if said second signal indicates that a television program currently being received corresponds to one of said items to be permitted;

activating a video appliance;

comparing said third signal to said set of prohibited classifications, and, if said classification signal indicates that a received program is a member of the set of prohibited classifications;

causing the video appliance to be temporarily deactivated until said classification signal indicates that a received program is no longer a member of the set of prohibited classifications.

2. A method of controlling a video appliance according to claim 1 wherein said video appliance is a video recorder.

3. A method of controlling a video appliance according to claim 1 wherein said video appliance is a television receiver.

4. A method according to any of claims 1–3 wherein said signals are transmitted as part of a broadcast television signal.

5. A method according to to any of claims 1–3 wherein said signals are transmitted as a data signal independent of a broadcast television signal.

6. A method according to any of claims 1–3 wherein said second and third signals have been transmitted from a monitoring station at which one or more persons monitor a number of television programs being broadcast on a number of channels and for each channel monitored, identify the program currently being broadcast, cause a signal indicating which television program is currently being broadcast and a signal indicating the class of program being broadcast to be transmitted.

7. A method of labelling a video program comprising the steps of:

receiving identifying signals representative of the names of a plurality of television programs currently available for reception and signals indicating the channel on which each said program can be received;

receiving a television program signal using a television receiver;

determining the channel to which said television receiver is tuned; and on command from a user:

processing said identifying signals to find the name of the television program currently available for reception that is associated with said determined channel;

forming a signal which when applied to a display means causes text corresponding to said found name to be visible; and displaying said name upon said display means.

8. A method of labelling a video program recording comprising the steps of:

receiving identifying signals representative of the names of a plurality of television programs currently available for reception and signals indicating the channel on which each said program can be received;

receiving a television program signal using a television receiver;

determining the channel to which said television receiver is tuned;

processing said identifying signals to find the name of the television program currently available for reception that is associated with said determined channel;

forming a name signal representative of said found name;

simultaneously recording said program signal and said name signal and subsequently simultaneously replaying said signals; and, on command from a user:

forming a signal which when applied to a display means causes text corresponding to said found name to be visible; and displaying said found name upon said display means.

9. A method according to claim 7 or 8 wherein said signal identifying the name of the television program currently being received has been transmitted from a monitoring station at which one or more persons monitor a number of television programs being broadcast on a number of channels and for each channel monitored, identify the program currently being broadcast and cause a signal indicating which television program is currently being broadcast to be transmitted.

10. A video appliance controller comprising:

means for receiving a first signal representative of a television program schedule, a second signal indicating which television program is currently being received and a third signal indicating the class of program being received;

means for converting said first signal into a display of text representative of a television program schedule;

first memory means for storing data specifying a subset of items of said displayed text as items to be permitted;

second memory means for storing data specifying a set of classifications which are to be prohibited;

means for altering the content of said first and second memory means; and controller means adapted to cause a video appliance to be activated if said second signal indicates that a television program currently being received corresponds to one of said items to be permitted as indicated by the content of said first memory means and to cause a video appliance to be temporarily deactivated if said third signal indicates that a received program is a member of the set of prohibited classifications as indicated by the content of said second memory means.

11. A video appliance controller according to claim 10 wherein said video appliance is a video recorder.

12. A video appliance controller according to claim 10 wherein said video appliance is a television receiver.

13. A video appliance controller according to any of claims 10–12 wherein said second and third signals are transmitted as part of a broadcast television signal.

14. A video appliance controller according to any of claims 10–12 wherein said second and third signals are transmitted as a data signal independent of a broadcast television signal.

15. A video appliance control system according to any of claims 10–12 and further comprising a monitoring station from where said second and third signals are transmitted, said monitoring station comprising:

means for monitoring a number of television programs being broadcast on a number of channels;

means for identifying the program currently being broadcast on each channel;

means for transmitting signals indicating which television program is currently being broadcast on each channel and the class of program being broadcast on each channel.

16. A video appliance controller according to any of claims 10 to 12 wherein said video appliance is controlled by means of infra-red control signals and further comprising:

a transmitter adapted to transmit infra-red signals to said video appliance;

a receiver adapted to receive infra-red signals from hand-held remote control means;

means for recognising those infra-red signals received by said infra-red receiver which correspond to appliance control commands;

memory means for forming a table of data representative of the most recent appliance control commands received; and means for causing said appliance control commands to be transmitted to said video appliance.

17. A video appliance controller according to any of claims 10 to 12 wherein said video appliance is controlled by means of infra-red control signals and further comprising:

a transmitter adapted to transmit infra-red signals to said video appliance;

a receiver adapted to receive infra-red signals from hand-held remote control means;

means for recognising infra-red signals received by said infra-red receiver corresponding to appliance control commands, detecting channel selection signals within said received infra-red signals, using said channel selection signals to calculate a channel number representative of a current channel being received and causing said appliance control commands to be transmitted to said video appliance;

means for receiving a channel indicating signal indicating the channel with which each of said received classification signals indicating a class of program being received is associated;

means for selecting a set of classifications which are to be prohibited;

means for comparing said current channel number with said channel indicating signals, and if the result is equality, comparing said classification signal to said set of prohibited classifications, and, if said classification signal indicates that a received program is a member of the set of prohibited classifications, causing a video appliance to be temporarily deactivated until said classification signal indicates that a received program is no longer a member of the set of prohibited classifications.

18. A television receiver comprising:
a television program signal receiver;
means for determining the channel to which said receiver is tuned;

means for receiving identifying signals representative of the names of a plurality of television programs currently available for reception and the channel on which each said program can be received;

means for processing said identifying signals to find the name of the television program currently available for reception that is associated with said determined channel; and display means adapted to display said found name on command from a user.

19. A video program recorder comprising:
a television program signal receiver;
means for determining the channel to which said receiver is tuned;

means for receiving identifying signals representative of the names of a plurality of television programs currently available for reception and the channel on which each said program can be received;

means for processing said identifying signals to find the name of the television program currently available for reception that is associated with said determined channel;

means for forming a name signal representative of said found name;

means for simultaneously recording said program signal and said name signal and subsequently simultaneously replaying said signals; and display means responsive to said replayed name signal and adapted to display said name on command from a user.

20. Apparatus according to claim 18 or 19 and further comprising a monitoring station from where said identifying signals are transmitted, said monitoring station comprising:

means for monitoring a number of television programs being broadcast on a number of channels;

means for identifying the program currently being broadcast on each channel; and means for transmitting a signal indicating which television program is currently being broadcast.

21. A video program recorder comprising:
a television program signal receiver;
means for determining the channel to which said receiver is tuned;

means for receiving identifying signals representative of the names of a plurality of television programs currently available for reception and the channel on which each said program can be received;

means for processing said identifying signals to find the name of the television program currently available for reception that is associated with said determined channel;

means for forming a name signal representative of said found name;

means for printing text corresponding to said found name.

* * * * *

UNITED STATES PATENT AND TRADEMARK OFFICE
CERTIFICATE OF CORRECTION

PATENT NO. : 5,253,066 C1
DATED : May 22, 2001
INVENTOR(S) : Peter S. Vogel

It is certified that error appears in the above-identified patent and that said Letters Patent is hereby corrected as shown below:

Title page,
Item [56], U.S. PATENT DOCUMENTS, change "5,674,575" to -- 5,675,575 --.
FOREIGN PATENT DOCUMENTS, change "29 18 846" to -- P 29 18 846.3-26 --.
OTHER PUBLICATIONS, change "Technical Papers of NCTA 31st Annual Convention and Exposition" to -- *Technical Papers of NCTA 31st Annual Convention and Exposition* --; change "Sommerthauser" to -- Sommerhauser --; add -- TV Guide, Feb. 6, 1989, San Francisco Metropolitan Schedule. --; add -- Videocipher Owner's Manual, M/A-Com., Publication Number 4096-048; Model VC-2000E or VC-2000E/B, undated. --; and add -- Videocipher Owner's Manual Update, M/A-Com., Issue Number 6, Feb. 1986, Publication Number 4096-052. --.

Column 1,
Line 5, change "INDICAYED" to -- INDICATED --.
Line 11, change "PHARAGRAPHS" to -- PARAGRAPHS --.
Line 60, change "clasification" to -- classification --.

Column 9,
Line 9, change "display" to -- displays --.

Column 10,
Line 17, change "indicate" to -- indicates --.

Signed and Sealed this

Twentieth Day of January, 2004

JON W. DUDAS
*Acting Director of the United States Patent and Trademark Office*

(12) REEXAMINATION CERTIFICATE (4361st)
United States Patent
Vogel

(10) Number: US 5,253,066 C1
(45) Certificate Issued: May 22, 2001

(54) TV RECORDING AND VIEWING CONTROL SYSTEM

(75) Inventor: Peter S. Vogel, Beverly Hills, CA (US)

(73) Assignee: United Video Properties, Inc., Tulsa, OK (US)

Reexamination Request:
No. 90/005,534, Oct. 18, 1999

Reexamination Certificate for:
| | |
|---|---|
| Patent No.: | 5,253,066 |
| Issued: | Oct. 12, 1993 |
| Appl. No.: | 07/793,436 |
| Filed: | Nov. 5, 1991 |

(22) PCT Filed: May 30, 1990
(86) PCT No.: PCT/AU90/00236
§ 371 Date: Nov. 5, 1991
§ 102(e) Date: Nov. 5, 1991
(87) PCT Pub. No.: WO90/15507
PCT Pub. Date: Dec. 13, 1990

(30) Foreign Application Priority Data

Jun. 1, 1989 (AU) .................................................... PJ4500

(51) Int. Cl.⁷ .................................................... H04N 5/445
(52) U.S. Cl. ................................ 725/28; 725/39; 725/56; 725/40; 725/54; 725/58; 348/564; 348/734; 348/906
(58) Field of Search ................................ 348/906, 564, 348/724, 734, 569, 563, 10, 460; 345/327, 328; 725/28, 40, 54, 58; 455/186.1, 186.2, 6.2, 6.3; 380/20

(56) References Cited

U.S. PATENT DOCUMENTS

| | | | |
|---|---|---|---|
| 3,757,225 | 9/1973 | Ulicki | 325/308 |
| 3,956,579 | 5/1976 | Doumit | 178/6 |
| 4,004,085 | 1/1977 | Makino et al. | 340/324 |
| 4,031,470 | 6/1977 | Kokado et al. | 325/396 |
| 4,088,958 | 5/1978 | Suzuki et al. | 325/396 |
| 4,162,513 | 7/1979 | Beyers, Jr. et al. | 358/191 |
| 4,170,782 | 10/1979 | Miller | 358/84 |
| 4,199,781 | 4/1980 | Doumit | 358/83 |
| 4,203,130 | 5/1980 | Doumit et al. | 358/1 |
| 4,264,925 | 4/1981 | Freeman et al. | 358/86 |

(List continued on next page.)

FOREIGN PATENT DOCUMENTS

| | | | |
|---|---|---|---|
| B-21629/83 | 5/1984 | (AU) | H04N/1/16 |
| B-76254/87 | 2/1988 | (AU) | H04N/5/76 |
| B-21592/88 | 3/1989 | (AU) | H04N/5/92 |

(List continued on next page.)

OTHER PUBLICATIONS

TV Guide, Feb. 6, 1989, San Francisco Metropolitan Schedule.
Videocipher Owner's Manual Update, M/A–Com, Issue No. 6, Feb. 1986, Publication No. 4096–052.
Videocipher Owner's Manual, M/A–Com., Publication No. 4096–048; Model No. VC–2000E or VC–2000E/B, undated.

(List continued on next page.)

Primary Examiner—Victor R. Kostak

(57) ABSTRACT

A signal representative of a television program guide, a signal indicating which program is currently being viewed of recorded and a signal indicating the class of program being viewed or recorded are received at the point of reception of a television program signal. The program guide signal is used to cause a program guide to be displayed on a television screen. A viewer selects one or more programs to be recorded or viewed from the displayed guide and selects a set of classifications that are to be permitted. While the received program indicating signal indicates that the current program is one of the selected programs and the received classifying signal indicates that the current program is of a permitted classification, recording or viewing of the program is enabled. A further extension of the invention causes the program identifying signal to be recorded on a video recording along with the program so that on replay the recording can visually be identified.

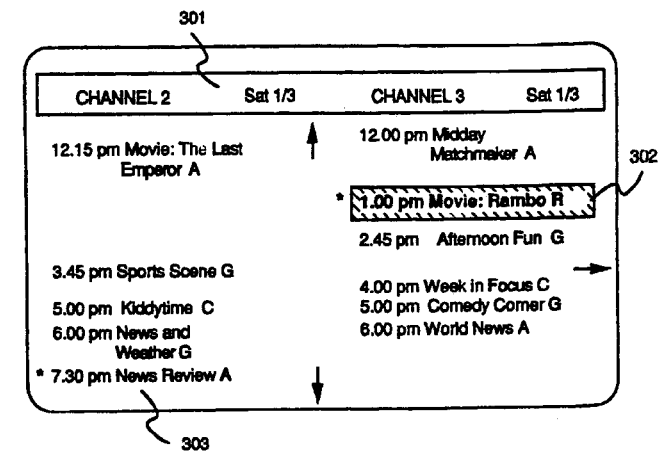

U.S. PATENT DOCUMENTS

| Patent No. | Date | Inventor | Class |
|---|---|---|---|
| 4,288,809 | 9/1981 | Yabe | 358/12 |
| 4,305,101 | 12/1981 | Yarbrough et al. | 360/69 |
| 4,329,684 | 5/1982 | Monteath et al. | 340/707 |
| 4,355,415 | 10/1982 | Goerge et al. | 455/185 |
| 4,381,522 | 4/1983 | Lambert | 358/86 |
| 4,390,901 | 6/1983 | Keiser | 358/147 |
| 4,422,105 | 12/1983 | Rodesch et al. | 358/903 |
| 4,425,579 | 1/1984 | Merrell | 358/86 |
| 4,496,171 | 1/1985 | Cherry | 283/61 |
| 4,520,404 | 5/1985 | Von Kohorn | 358/335 |
| 4,556,904 | 12/1985 | Monat | 358/147 |
| 4,605,964 | 8/1986 | Chard | 358/147 |
| 4,605,973 | 8/1986 | Von Kohorn | 358/335 |
| 4,620,229 | 10/1986 | Amano et al. | 358/194.1 |
| 4,635,121 | 1/1987 | Hoffman et al. | 358/188 |
| 4,685,131 | 8/1987 | Horne | 380/20 |
| 4,691,351 | 9/1987 | Hayashi et al. | 380/10 |
| 4,706,121 | 11/1987 | Young | 358/142 |
| 4,718,107 | 1/1988 | Hayes | 455/4 |
| 4,750,213 | 6/1988 | Novak | 455/67 |
| 4,751,578 | 6/1988 | Reiter et al. | 358/183 |
| 4,787,063 | 11/1988 | Muguet | 364/900 |
| 4,847,696 | 7/1989 | Matsumoto et al. | 358/335 |
| 4,857,999 | 8/1989 | Welsh | 358/84 |
| 4,864,429 | 9/1989 | Eigeldinger et al. | 358/349 |
| 4,879,611 | 11/1989 | Fukui et al. | 360/69 |
| 4,885,775 | 12/1989 | Lucas | 380/10 |
| 4,888,796 | 12/1989 | Olivo, Jr. | 379/101 |
| 4,908,707 | 3/1990 | Kinghorn | 358/147 |
| 4,908,713 | 3/1990 | Levine | 358/335 |
| 4,930,158 | 5/1990 | Vogel | 380/5 |
| 4,930,160 | 5/1990 | Vogel | 380/23 |
| 4,959,720 | 9/1990 | Duffield et al. | 358/191.1 |
| 4,977,455 | 12/1990 | Young | 358/142 |
| 4,994,908 | 2/1991 | Kuban et al. | 358/86 |
| 5,001,554 | 3/1991 | Johnson et al. | 358/86 |
| 5,038,211 | 8/1991 | Hallenbeck | 358/142 |
| 5,047,867 | 9/1991 | Strubbe et al. | 358/335 |
| 5,075,771 | 12/1991 | Hashimoto | 358/84 |
| 5,093,718 | 3/1992 | Hoarty et al. | 358/84 |
| 5,109,279 | 4/1992 | Ando | 358/147 |
| 5,134,719 | 7/1992 | Mankovitz | 455/154.1 |
| 5,144,663 | 9/1992 | Kudelski | 380/16 |
| 5,151,789 | 9/1992 | Young | 358/194.1 |
| 5,161,019 | 11/1992 | Emanual | 358/183 |
| 5,168,353 | 12/1992 | Walker et al. | 358/86 |
| 5,172,111 | 12/1992 | Olivo, Jr. | 340/625.31 |
| 5,182,640 | 1/1993 | Takano | 358/86 |
| 5,200,822 | 4/1993 | Bronfin et al. | 358/142 |
| 5,210,611 | 5/1993 | Yee et al. | 358/191.1 |
| 5,220,420 | 6/1993 | Hoarty et al. | 358/86 |
| 5,231,493 | 7/1993 | Apitz | 358/146 |
| 5,235,415 | 8/1993 | Bonicel et al. | 358/84 |
| 5,239,540 | 8/1993 | Rovira et al. | 370/77 |
| 5,247,364 | 9/1993 | Banker et al. | 358/191.1 |
| 5,260,788 | 11/1993 | Takano et al. | 358/142 |
| 5,293,357 | 3/1994 | Hallenbeck | 348/734 |
| 5,301,028 | 4/1994 | Banker et al. | 348/570 |
| 5,307,172 | 4/1994 | Oh | 358/335 |
| 5,311,423 | 5/1994 | Clark | 364/401 |
| 5,315,392 | 5/1994 | Ishikawa et al. | 348/570 |
| 5,317,391 | 5/1994 | Banker et al. | 348/6 |
| 5,343,300 | 8/1994 | Henning | 348/478 |
| 5,353,121 | 10/1994 | Young et al. | 348/563 |
| 5,371,795 | 12/1994 | Vogel | 380/23 |
| 5,390,027 | 2/1995 | Henmi et al. | 358/335 |
| 5,412,720 | 5/1995 | Hoarty | 380/15 |
| 5,442,700 | 8/1995 | Snell et al. | 380/15 |
| 5,446,488 | 8/1995 | Vogel | 348/3 |
| 5,465,385 | 11/1995 | Ohga et al. | 455/6.1 |
| 5,477,262 | 12/1995 | Banker et al. | 348/7 |
| 5,479,266 | 12/1995 | Young et al. | 358/335 |
| 5,479,268 | 12/1995 | Young et al. | 358/335 |
| 5,526,034 | 6/1996 | Hoarty et al. | 348/7 |
| 5,532,754 | 7/1996 | Young et al. | 348/569 |
| 5,552,833 | 9/1996 | Henmi et al. | 348/460 |
| 5,587,734 | 12/1996 | Lauder et al. | 348/10 |
| 5,619,274 | 4/1997 | Roop et al. | 348/461 |
| 5,621,579 | 4/1997 | Yuen | 386/121 |
| 5,644,692 | 7/1997 | Eick | 395/326 |
| 5,663,757 | 9/1997 | Morales | 348/13 |
| 5,674,575 | 10/1997 | Wall, Jr. et al. | 370/326 |
| 5,692,214 | 11/1997 | Levine | 395/833 |
| 5,724,203 | 3/1998 | Kwoh et al. | 360/72.3 |
| 5,727,060 | 3/1998 | Young | 380/10 |
| 5,790,198 | 8/1998 | Roop et al. | 348/460 |
| 5,808,608 | 9/1998 | Young et al. | 345/327 |
| 5,809,204 | 9/1998 | Young et al. | 386/83 |
| 5,812,206 | 9/1998 | Sarginson | 348/460 |
| B1 4,706,121 | 12/1993 | Young | 358/142 |

FOREIGN PATENT DOCUMENTS

| Document No. | Date | Country | Class |
|---|---|---|---|
| 29 18 846 | 11/1980 | (DE) | F26B/13/02 |
| 29 18 846 A1 | 11/1980 | (DE) | F26B/13/02 |
| 34 24 812 C1 | 7/1984 | (DE) | H04N/5/76 |
| 33 35 082 A1 | 4/1985 | (DE) | H04N/5/44 |
| 33 37 204 A1 | 4/1985 | (DE) | H04N/5/44 |
| 35 27 939 A1 | 2/1987 | (DE) | H04N/7/087 |
| 0 214 326 B1 | 3/1987 | (EP) | H04N/7/087 |
| 0 237 958 B1 | 9/1987 | (EP) | H04N/5/782 |
| 0 300 562 A1 | 1/1989 | (EP) | H04N/7/08 |
| 0 337 336 A3 | 10/1989 | (EP) | H04N/7/087 |
| 0 373 297 | 6/1990 | (EP) | H04N/7/087 |
| 0 420 123 A2 | 4/1991 | (EP) | H04N/5/782 |
| 0 449 985 B1 | 10/1991 | (EP) | H04N/5/782 |
| 0 493 099 A2 | 7/1992 | (EP) | H04N/7/173 |
| 0 763 938 A2 | 3/1997 | (EP) | H04N/7/087 |
| 0 424 469 B1 | 9/1997 | (EP) | H04N/7/087 |
| 2 034 995 | 6/1980 | (GB) | H33J/7/18 |
| 2 126 002 | 3/1984 | (GB) | G11B/15/02 |
| 2 185 670 | 7/1987 | (GB) | H04N/7/087 |
| 2 207 314 | 1/1989 | (GB) | G11B/15/02 |
| 2 209 417 | 5/1989 | (GB) | H04N/7/16 |
| 2 210 526 | 6/1989 | (GB) | H03J/5/00 |
| 2 215 928 | 9/1989 | (GB) | H04N/5/782 |
| 2 232 031 | 11/1990 | (GB) | H04N/5/445 |
| 49-135513 | 12/1974 | (JP) . | |
| 55-63185 | 5/1980 | (JP) | H04N/5/44 |
| 56-96304 | 8/1981 | (JP) | G05B/19/02 |
| 57-65982 | 4/1982 | (JP) | H04N/7/16 |
| 58-137334 | 8/1983 | (JP) | H04B/1/06 |
| 58-191585 | 11/1983 | (JP) | H04N/7/08 |
| 58-196738 | 11/1983 | (JP) | H04H/1/00 |
| 58-210776 | 12/1983 | (JP) | H04N/7/08 |
| 59-141878 | 8/1984 | (JP) | H04N/5/64 |
| 60-29958 | 2/1985 | (JP) | G11B/15/02 |
| 60-61935 | 4/1985 | (JP) | G11B/15/02 |
| 61-50470 | 3/1986 | (JP) | H04N/5/44 |
| 62-8389 | 1/1987 | (JP) | G11B/27/34 |
| 62-60384 | 3/1987 | (JP) | H04N/7/173 |
| 62-66493 | 3/1987 | (JP) | G11B/27/28 |
| 5-42746 | 6/1993 | (JP) | G11B/15/02 |
| WO 87/06416 | 10/1987 | (WO) | H04N/5/782 |
| WO 88/04507 | 6/1988 | (WO) | H04N/7/087 |
| WO 89/03085 | 4/1989 | (WO) | G06F/7/04 |
| WO 90/00847 | 1/1990 | (WO) | H04N/7/087 |
| WO 90/03706 | 4/1990 | (WO) | H04N/7/173 |
| WO 90/07844 | 7/1990 | (WO) | H04N/5/782 |
| WO 90/10351 | 9/1990 | (WO) | H04N/7/087 |
| WO 91/07050 | 5/1991 | (WO) | H04N/5/44 |
| WO 92/04801 | 3/1992 | (WO) | H04N/5/76 |

| | | | |
|---|---|---|---|
| WO 93/08542 | 4/1993 | (WO) | G06K/19/06 |
| WO 93/11640 | 6/1993 | (WO) | H04N/7/16 |

OTHER PUBLICATIONS

Michael Dufresne, "New Services: An Integrated Cable Network's Approach, Videotron Communication LTEE", Technical Papers of NCTA 31st Annual Convention & Exposition, pp. 156–160 (1982).

Yutaka Ichinoi and Shinji Hirano, "Recording and Decoding of Teletext Signal with S–VHS VCR", IEEE Transactions on Consumer Electronics; vol. 35, Nov. 1989, pp. 787–802.

Arthur Heller, "VPS—A New System For Program–Controlled Recording", Broadcasting Service Reports, Issue 4, 1985, pp. 161–169.

Arthur Heller, "VPS A New System For Domestic VCR Start/Stop BY Programme Labels Transmitted Within The Insertion Data Line", Symposium Record, Broadcast Sessions, 14th International TV Symposium, Montreux, Switzerland, Jun. 1985, pp. 345–352.

W. Sommerthauser, "Video Program System: Flexible Programming With VPS", Funkschau, vol. 25, 1985, pp. 47–51.

Richard G. Merrell, "TAC–Timer", *NCTA Technical Papers*, 1986, pp. 203–206.

A. James, "ORACLE—Broadcasting the Written Word," *Wireless World*, vol. 79, Jul. 1973, pp. 314–316.

S. M. Edwardson and A. Gee, "CEEFAX: A Proposed New Broadcasting Service", *Journal of the SMPTE*, vol. 83, Jan. 1974, pp. 14–19.

G. A. McKenzie, "ORACLE—An Information Broadcasting Service Using Data Transmission in the Vertical Interval", *Journal of the SMPTE*, vol. 83, Jan. 1974, pp. 6–10.

"Addressable Converters: A New Development at Cable Data", Via Cable, vol. 1, No. 12, Dec. 1981, Cable Data, Sacramento, California.

"A New Approach To Addressability", Brochure, Cable Data, Sacramento, California, undated.

"Using Videotex to Program Video Cassette Recorders", *Broadcast Engineering Reports*, vol. 26, Nov.–Dec. 1982, pp. 254–257.

E. Bryan Carne, "The Wired Household", *IEEE Spectrum*, vol. 16, Oct. 1979, pp. 61–66.

*LSI Circuits for Teletex and Viewdata, The Lucy Generation*, Mullard Limited, Jun. 1981.

D. J. Beakhust and M. C. Gander, "Teletex and Viewdata—A Comprehensive Component Solution", *Proc. IEE*, vol. 126, No. 12, Dec. 1979, pp. 1374–1396.

Mullard Application Laboratory, Memo, "VCR Programming Systems", May 27, 1987.

"Specification of the Domestic Video Programme Delivery Control System (PDC)", European Broadcasting Union, SPB 459 Revision 2, Draft—Jan. 1991.

Bernard J. Rogers, "Broadcast Service Data", *British Videotex and Teletext Technical Committee and UK Study Group CCIR 11B*, Apr. 4, 1988.

Bernard J. Rogers, "Broadcast Service Data", *British Videotax and Teletex Technical Committee and UK Study Group CCIR 11B*, Apr. 6, 1988.

Richard N. Jackson, "Home Communications 1: Teletext and Viewdata", *IEEE Spectrum*, Mar. 1980, pp. 26–32.

*Videotex, Viewdata, Teletext*, Online Publications Ltd., 1980, pp. 9, 29–38, 69, 125, 127 and 451.

Joseph Roizen, "Teletext in the USA", *SMPTE Journal*, Jul 1981, pp. 602–606, and 608–610.

G. Morgan, "Teletex—Present and Future", *Communications Engineering International*, Feb. 1981, pp. 19–25.

John Blank, "System and Hardware Considerations of Home Terminals with Telephone Computer Access", *IEEE Transactions on Consumer Electronics*, vol. CE–25, No. 3, Jul. 1999, pp. 311–316.

Rick Connolly, "Nibble T.V. Guide", *Nibble Magazine*, Apr. 1984, pp. 48, 49, 51–53, 55 and 56.

*The Proceedings of a Conference on Cable Television and the Performing Arts*, Sponsored by New York University, School of the Arts, Jun. 5–7, 1981, pp. i–ii, and 1–3.

Wire Delivery, "There's more to one–way addressability than meets the eye", advertisement, Cable Data, Sacramento, California, undated.

James Sorce et al., "Designing a Broadband Residential Entertainment Service: A Case Study", GTE Laboratories Incorporated, pp. 141–148, undated.

N. Kokado et al., "A Programmable TV Receiver", *IEEE Transactions On Consumer Electronics*, Feb. 1976, pp. 69–83.

Larry T. Pfister, "TeleText: Its Time Has Come", Prepared For The IGC Videotex/Teletext Confernece, Andover, Massachusetts, Dec. 1992.

Von Gerhard Eitz und Karl–Ulrich Oberlies, "Videotext Programmiert Videoheimgeräte (VPV)", Rundfunktechnische Mitteilungen, vol. 5, Sep. 1986, pp. 223–239.

"Program Listings Never Looked So Good!", advertisement, DIP/TV Watch, Atlanta, Georgia, undated.

"Now, Through the Advances of the Computer Age, You Can Get the Information You Want, When You Want It. Instantly and Conveniently, On Your Home TV Screen," brochure, Time Video Information Services, Inc., undated.

"TV Listings Software User Manual," Time Video Information Services, Inc., undated.

"TV Listings Functional Spec.," Time Video Information Services, Inc., undated.

US 5,253,066 C1

REEXAMINATION CERTIFICATE ISSUED UNDER 35 U.S.C. 307

THE PATENT IS HEREBY AMENDED AS INDICAYED BELOW.

Matter enclosed in heavy brackets [ ] appeared in the patent, but has been deleted and is no longer a part of the patent; matter printed in italics indicates additions made to the patent.

ONLY THOSE PHARAGRAPHS OF THE SPECIFICATION AFFECTED BY AMENDMENT ARE PRINTED HEREIN.

Column 2, lines 12–26:

According to another aspect of the present invention there is provided a method of selecting television programs to be viewed including the the steps of receiving a first signal conveying data representative of a television programming schedule, decoding said received signals, displaying the resulting decoded schedule information, identifying a number of programs displayed in said schedule as programs to be [recorded] *viewed*, receiving a second signal identifying for each television channel the program being curently broadcast, decoding said second signal, and enabling viewing of the selected programs according to the programs selected from the schedule as those to be viewed and the content of said decoded second signal.

Column 3, lines 24–54:

As seen in FIG. 1, an embodiment of the invention is provided for use in conjunction with video cassette recorders (VCRs). [this] *This* embodiment takes the form of a device which communicates with the VCR via an infrared (IR) control signal, this signal being similar to the control signal used by the hand-held remote control of conventional VCRs. This embodiment of the invention is in turn controlled by a hand-held remote control. Using this control means, the invention allows the user to control the usual functions of a VCR, such as recording or playing a tape, as well as the novel functions provided by this invention. This arrangement is particularly beneficial as it can be used with a wide range of VCRs without modification of the VCR. Referring to FIG. 1, RF input 101 is derived from the television antenna being used to receive off-air programs *from* antenna 116 or a separate antenna 117, and comprises a signals modulated with data relating to the television schedule and the programs currently being broadcast. This signal is received by receiver 102, and fed to demodulator 103 which provides as an output digital data which is fed to an input of microprocessor 104.

Column 3, lines 46–66:

Microprocessor 104 executes program instructions stored in read-only-memory ROM 107, and is responsible for all control and user-interface functions of this embodiment of the invention. Received data comprises two main types: periodic data and real-time data. Periodic data comprises the television schedule for the current day and future days, including the name of each program, its scheduled start time, the channel on which it is to be broadcast, and a clasification (such as whether or not it is suitable for viewing by children). The periodic data is transmitted from a remote source, such as the television broadcast station or a separate transmitting station, at infrequent intervals, say once every hour. Real-time data comprises information which identifies which program is currently being broadcast on each channel, including the program classification. This data is transmitted from the remote source as soon as possible after a [charge] *change* of program on any channel, and is then repeated occasionally, say every 10 seconds, until another change of program occurs.

Column 4, lines 26–39:

Referring now to FIG. 2, the layout of switches of the user control keyboard can be seen. Twelve switches labelled "CHANNEL" are used to select one of 12 channels to be viewed. The switches "Rew", "FF", "Rec", "Play", "Pause" and "Stop" *control* the rewind, fast forward, record, play, pause and stop functions of the VCR in the usual manner. The switch "sel" is used to select a menu option. The four triangular switches surrounding the "sel" switch cause movement of the cursor on a menu display in one of the four directions indicated. The switches "C", "P", "S" and "?" are used to initiate the classification, program, status and QUERY functions respectively. The operation of these four functions will now be described.

Column 7, lines 39–64:

According to a further extension of the invention, program identification data within the invention can be used to label tape recordings, using the identifying data received by the data receiver of the invention to provide the labelling information. For example, the invention can be arranged to place a suitable code in the vertical interval of the video recording so that the name of a program is recorded as the program is recorded. This extension permits programs recorded on a tape to be identified by name on replay, as well as facilitating automatic location of a program by name. An embodiment of this aspect of the invention is shown in FIG. 5. Processor 505 receives identifying signals and a channel sense signal 605 and determines the channel being received as described above in relation to FIG. 1. Recorder 504 receives two record signal inputs; the video output 503 of TV receiver 501 and the output of text generator 109. These signals are recorded simultaneously using any suitable techniques. For example, the text signal can be recorded in the vertical interval of the video signal. When the tape is replayed, the two signals are processed by video processor 506 to feed a video signal to video input 502 of receiver 506. A user interface 508 connected to video processor 506 allows the user to select whether the TV displays *the* replayed program, the program name, or both.

AS A RESULT OF REEXAMINATION, IT HAS BEEN DETERMINED THAT:

The patentability of claims 1–6, 10–17 and 21 is confirmed.

Claims 7, 8, 18 and 19 are determined to be patentable as amended.

Claims 9 and 20, dependent on an amended claim, are determined to be patentable.

New claims 22–128 are added and determined to be patentable.

7. A method of *providing a television schedule display and* labelling a video program comprising the steps of:

receiving identifying signals representative of the names of a plurality of television programs currently available for reception and signals indicating the channel on which each *of* said *plurality of television* programs can be received;

displaying a two-dimensional arrangement of television schedule information including multiple times, titles, and multiple channels for at least a portion of said plurality of television programs, wherein the multiple times are indicated in a substantially linear fashion along a first dimension of the two-dimensional arrangement and wherein the muliple channels are indicated in a substantially linear fashion along a second dimension of the two-dimensional arrangement;

displaying a cursor in the two-dimensional arrangement that may be repositioned in both the first dimension and the second dimension in response to user input and that allows a user to identify a selected program of said purality of television programs in the two-dimensional arrangement;

receiving a television program signal using a television receiver;

determining the channel to which said television receiver is tuned; and on command from [a] *the* user:

processing said identifying signals to find the name of [the] *one of said plurality of* television programs currently available for reception that is associated with said determined channel;

forming a signal which when applied to a display means causes text corresponding to said found name to be visible; and displaying said *found* name upon said display means.

8. A method of labelling a video program recording comprising the steps of:

receiving identifying signals representative of the names of a plurality of television programs currently available for reception and signals indicating the channel on which each *of* said *plurality of television* programs can be received;

receiving a television program signal using a television receiver;

determining the channel to which said television receiver is tuned;

processing said identifying signals to find the name of [the] *one of said plurality* television programs currently available for reception that is associated with said determined channel;

forming a name signal representative of said found name;

simultaneously recording said program signal and said name signal and subsequently simultaneously replaying said signals; and, on command from a user *during replay*:

forming a signal *from said replayed name signal* which when applied to a display means causes text corresponding to said found name to be visible; and displaying said name upon said display means.

18. A televison receiver comprising:

a television program signal receiver *for receiving a television program signal*;

means for determining the channel to which said receiver is tuned;

means for receiving identifying signals representative of the names of a plurality of television programs currently available for reception and the channel on which each *of* said *plurality of television* programs can be received;

means for processing said identifying signals to find the name of [the] *one of the plurality of* television programs currently available for reception that is associated with said determined channel, *and for causing to be displayed:*

*a two-dimensional arrangement of television schedule information including multiple times, titles, and multiple channels for at least a portion of said plurality of television programs, wherein the multiple times are indicated in a substantially linear fashion along a first dimension of the two-dimensional arrangement and wherein the multiple channels are indicated in a substantially linear fashion along a second dimension of the two-dimensional arrangement, and*

*a cursor in the two-dimensional arrangement that may be repositioned in both the first dimension and the second dimension in response to user input and that allows a user to identify a selected program of said plurality of television programs in the two-dimensional arrangement*; and display means adapted to display said found name on command from [a] *the* user.

19. A video program recorder comprising:

a television program signal receiver;

means for determining the channel to which said receiver is tuned;

means for receiving identifying signals representative of the names of a plurality of television programs currently available for reception and the channel on which each *of* said *plurality of television* programs can be received;

means for processing said identifying signals to find the name of [the] *one of said plurality of* television programs currently available for reception that is associated with said determined channel;

means for forming a name signal representative of said found name;

means for simultaneously recording said program signal and said name signal and subsequently simultaneously replaying said signals; and display means responsive to said replayed name signal and adapted to display said name *from said replayed name signal* on command from a user *during replay*.

22. *The method of claim 7, wherein the first dimension is a vertical dimension of said display means.*

23. *The method of claim 7, wherein the second dimension is a horizontal dimension of said display means.*

24. *The method of claim 7, wherein the two-dimensional arrangement includes classification information for at least a portion of said plurality of television programs.*

25. *The method of claim 7, wherein the two-dimensional arrangement includes a recording indicator that indicates that a television program identified by the recording indicator is to be recorded.*

26. *The method of claim 7, wherein the two-dimensional arrangement includes a directional indicator indicating that more television schedule information is available to be displayed by moving the cursor in a direction indicated by the directional indicator.*

27. *The method of claim 7, further comprising displaying on said display means, the selected program identified by the user.*

28. *The method of claim 7, further comprising recording the selected program identified by the user.*

29. *The method of claim 28, wherein the recording is based upon a scheduled time of broadcast of the selected program.*

30. The method of claim 28, wherein the recording is based upon a receipt of an identifying signal that indicates that the selected program is currently being broadcast.

31. The method of claim 7, further comprising tuning said television receiver to the selected program identified by the user.

32. The method of claim 7, further comprising displaying details relating to the selected program identified by the user.

33. The method of claim 32, wherein the details include a description of the selected program identified by the user.

34. The method of claim 7, wherein said identifying signals are received with said plurality of television programs currently available for reception.

35. The method of claim 7, wherein the signals indicating the channel on which each of said plurality of television programs can be received are received with said plurality of television programs currently available for reception.

36. A method of labelling and controlling viewing of a video program comprising the steps of:
receiving identifying signals representative of the names of a plurality of television programs currently available for reception and signals indicating the channel on which each of said plurality of television programs can be received;
receiving a television program signal using a television receiver;
inhibiting the television program signal if a classification code that classifies the television program signal corresponds to a prohibited classification code;
determining the channel to which said television receiver is tuned; and
on command from a user:
processing said identifying signals to find the name of one of said plurality of television programs currently available for reception that is associated with said determined channel;
forming a signal which when applied to a display means causes text corresponding to said found name to be visible; and
displaying said found name upon said display means.

37. The method of claim 36, wherein the inhibiting of the television program signal comprises preventing at least a portion of the television program signal from being recorded.

38. The method of claim 36, wherein the inhibiting of the television program signal comprises preventing at least a portion of the television program signal from being viewed.

39. The method of claim 36, wherein the inhibiting of the television program signal comprises preventing at least a portion of audio associated with the television program signal from being audible.

40. The method of claim 36, wherein the classification code that classifies the television program signal is received with the television program signal.

41. The method of claim 36, wherein the prohibited classification code corresponds to at least one of television programs suitable for children, television programs suitable for general viewing, adult television programs, restricted television programs, advertisements, and non-program material.

42. The method of claim 36, further comprising accepting a user selection of the prohibited classification code.

43. The method of claim 42, wherein the accepting a user selection comprises:
displaying a plurality of selectable classification options on said display means; and
receiving user input to identify the prohibited classification from the plurality of selectable classification options.

44. The method of claim 36, further comprising enabling the prohibited classification code to be changed only when a personal identity number is received.

45. The method of claim 36, wherein said identifying signals are received with said plurality of television programs currently available for reception.

46. The method of claim 36, wherein the signals indicating the channel on which each of said plurality of television programs can be received are received with said plurality of television programs currently available for reception.

47. A method of labelling a video program comprising the steps of:
receiving identifying signals representative of the names of a plurality of television programs currently available for reception, signals indicating the channel on which each of said plurality of television programs can be received, and signals representative of details for at least a portion of said plurality of television programs;
receiving a television program signal using a television receiver;
determining the channel to which said television receiver is tuned;
on a first command from a user:
processing said identifying signals to find the name of one of said plurality of television programs currently available for reception that is associated with said determined channel;
forming a signal which when applied to a display means cause text corresponding to said found name to be visible; and
displaying said found name upon said display means; and
on a second command from the user:
processing the signals representative of details to find details for the one of said plurality television programs currently available for reception that is associated with said determined channel;
forming a signal which when applied to said display means causes text corresponding to the found details to be visible; and
displaying the found details upon said display means.

48. The method of claim 47, wherein the found details comprise a description of the one of said plurality of television programs currently available for reception that is associated with said determined channel.

49. The method of claim 47, wherein said identifying signals are received with said plurality of television programs currently available for reception.

50. The method of claim 47, wherein the signals indicating the channel on which each of said plurality of television programs can be received are received with said plurality of television programs currently available for reception.

51. A method of providing a television schedule display and labelling a video program comprising the steps of:
receiving identifying signals representative of the names of a plurality of television programs currently available for reception, signals indicating the channel on which each of said plurality of televison programs can be received, and signals representative of details for at least a portion of said plurality of television programs;
providing an interactive display of television schedule information including times, titles, and channels for at least a portion of said plurality of television programs;

displaying a cursor that allows a user to identify a selected program of said plurality of television programs in the interactive display of television schedule information;

displaying details relating to the selected program identified by the user;

receiving a television program signal using a television receiver;

determining the channel to which said television receiver is tuned; and on command from a user:
processing said identifying signals to find the name of one of said plurality of television programs currently available for reception that is associated with said determined channel;

forming a signal which when applied to a display means causes text corresponding to said found name to be visible; and displaying said found name upon said display mean.

52. The method of claim 51, wherein the details relating to the selected program comprise a description of the selected program.

53. The method of claim 51, wherein the interactive display includes classification information for at least a portion of said plurality of television programs.

54. The method of claim 51, wherein the interactive display includes a recording indicator that indicates that a television program identified by the recording indicator is to be recorded.

55. The method of claim 51, wherein the interactive display includes a directional indicator indicating that more television schedule information is available to be displayed by moving the cursor in a direction indicated by the directional indicator.

56. The method of claim 51, further comprising displaying on said display means, the selected program identified by the user.

57. The method of claim 51, further comprising recording the selected program identified by the user.

58. The method of claim 57, wherein the recording is based upon a scheduled time of broadcast of the selected program.

59. The method of claim 57, wherein the recording is based upon a receipt of an identifying signal that indicates that the selected program is currently being broadcast.

60. The method of claim 51, further comprising tuning said television receiver to the selected program identified by the user.

61. The method of claim 51, wherein said identifying signals are received with said plurality of television programs currently available for reception.

62. The method of claim 51, wherein the signals indicating the channel on which each of said plurality of television programs can be received are received with said plurality of television programs currently available for reception.

63. The television receiver of claim 18, wherein the first dimension is a vertical dimension of said display means.

64. The television receiver of claim 18, wherein the second dimension is a horizontal dimension of said display means.

65. The television receiver of claim 18, wherein the two-dimensional arrangement includes classification information for at least a portion of said plurality of television programs.

66. The television receiver of claim 18, wherein the two-dimensional arrangement includes a recording indicator that indicates that a television program identified by the recording indicator is to be recorded.

67. The television receiver of claim 18, wherein the two-dimensional arrangement includes a directional indicator indicating that more television schedule information is available to be displayed by moving the cursor in a direction indicated by the directional indicator.

68. The television receiver of claim 18, wherein the means for processing also causes the selected program identified by the user to be displayed on the display means.

69. The television receiver of claim 18, wherein the means for processing also causes the selected program identified by the user to be recorded.

70. The televison receiver of claim 69, wherein recording is based upon a scheduled time of broadcast of the selected program.

71. The television receiver of claim 69, wherein recording is based upon a receipt of an identifying signal that indicates that the selected program is currently being broadcast.

72. The television receiver of claim 18, wherein the television program signal receiver tunes to the selected program identified by the user.

73. The television receiver of claim 18, wherein the means for processor and for causing causes to be displayed details relating to the selected program identified by the user.

74. The television receiver of claim 73, wherein the details include a description for the selected program identified by the user.

75. The television receiver of claim 18, wherein the means for receiving receives said identifying signals with said plurality of television programs currently available for reception.

76. A television receiver comprising:
a television program signal receiver for receiving a televison program signal;

means for determining the channel to which said receiver is tuned;

means for receiving identifying signals representative of the names of a plurality of television programs currently available for reception and the channel on which each of said plurality of television programs can be received;

means for processing said identifying signals to find the name of one of said plurality of television programs currently available for reception that is associated with said determined channel and for inhibiting the television program signal when a classification code that classifies the television program signal corresponds to a prohibited classification code; and display means adapted to display said found name on command from a user.

77. The television receiver of claim 76, wherein the means for processing and for inhibiting the television program signal prevents at least a portion of the television program signal from being recorded.

78. The television receiver of claim 76, wherein the means for processing and for inhibiting the television program signal prevents at least a portion of the television program signal from being viewed.

79. The television receiver of claim 76, wherein the means for processing and for inhibiting the television program signal prevents at least a portion of the audio of the television program signal from being audible.

80. The television receiver of claim 76, wherein means for receiving receives the classification code as part of said identifying signals.

81. The television receiver of claim 76, wherein the prohibited classification code corresponds to at least one of television programs suitable for children, television programs suitable for general viewing, adult television programs, restricted television programs, advertisements, and non-program material.

82. The television receiver of claim 76, further comprising a user input device for accepting a user selection of the prohibited classification code.

83. The television receiver of claim 82, wherein the display means display a plurality of selectable classification options and wherein the user input device is used to identify the prohibited classification code from the plurality of selectable classification options.

84. The television receiver of claim 76, wherein the means for processing and for inhibiting also enables the prohibited classification code to be changed only when a personal identity number is received.

85. The television receiver of claim 76, wherein the means for receiving receives said identifying signals simultaneously with the television program signal.

86. A television receiver comprising:
   a television program signal receiver for receiving a television program signal;
   means for determining the channel to which said receiver is tuned;
   means for receiving identifying signals representative of the names of a plurality of television programs currently available for reception and the channel on which each of said plurality of television programs can be received, and signals representative of details for at least a portion of said plurality of television programs;
   means for processing said identifying signals to find the name of one of said plurality of television programs currently available for reception that is associated with said determined channel, and for processing the signals representative of details to find details for the one of said plurality of television programs currently available for reception that is associated with said determined channel; and
   display means adapted to display said found name on a first command from a user and the found details on a second command from the user.

87. The television receiver of claim 86, wherein the found details comprise a description of the one of said plurality of television programs currently available for reception that is associated with said determined channel.

88. The television receiver of claim 86, wherein said identifying signals are received with said plurality of television programs currently available for reception.

89. A television receiver comprising:
   a television program signal receiver for receiving a television program signal;
   means for determining the channel to which said receiver is tuned;
   means for receiving identifying signals representative of the names of a plurality of television programs currently available for reception and the channel on which each of said plurality of television programs can be received, and signals representative of details for at least a portion of said plurality of television programs;
   means for generating an interactive display of television schedule information including times, titles, and channels for at least a portion of said plurality of television programs, for causing a cursor to be displayed that allows a user to identify a selected program of said plurality of television programs in the interactive display of television schedule information, and for processing said identifying signals to find the name of one of said plurality of television programs currently available for reception that is associated with said determined channel; and
   display means adapted to display details relating to the selected program identified by the user and to display said found name on a first command from the user.

90. The television receiver of claim 89, wherein the details relating to the selected program comprise a description of the selected program.

91. The television receiver of claim 89, wherein the means for generating causes the interactive display to include classification information for at least a portion of said plurality of television programs.

92. The television receiver of claim 89, wherein the means for generating causes the interactive display to include a recording indicator that indicate that a television program identified by the recording indicator is to be recorded.

93. The television receiver of claim 89, wherein the means for generating causes the interactive display to include a directional indicator that indicates that more television schedule information is available to be displayed by moving the cursor in a direction indicated by the directional indicator.

94. The television receiver of claim 89, wherein the means for generating causes of the selected program to be displayed on the display means.

95. The television receiver of claim 89, wherein the means for generating causes the selected program to be recorded.

96. The television receiver of claim 95, wherein recording of the selected program is based upon a scheduled time of broadcast of the selected program.

97. The television receiver of claim 95, wherein recording of the selected program is based upon a receipt of an identifying signal that indicates whether the selected program is currently being broadcast.

98. The television receiver of claim 89, wherein said television program signal receiver tunes to the selected program.

99. The television receiver of claim 89, wherein the means for receiving receives said identifying signals with said plurality of television programs.

100. A method of providing a television schedule display and labelling a video program comprising the steps of:
   receiving identifying signals representative of the names of a plurality of television programs currently available for reception and signals indicating the channel on which each of said plurality of television programs can be received;
   displaying a two-dimensional arrangement of television schedule information including multiple times, titles, and multiple channels for a least a portion of said plurality of television programs, wherein the multiple times are indicated in a substantially linear fashion along a first dimension of the two-dimensional arrangement and wherein the multiple channels are indicated in a substantially linear fashion along a second dimension of the two-dimensional arrangement;
   selecting a program in the two-dimensional arrangment in response to input from a user;
   receiving a television program signal using a television receiver;
   determining the channel to which said television receiver is tuned; and
   on command from the user:

processing said identifying signals to find the name of one of said plurality of television programs currently available for reception that is associated with said determined channel;

forming a signal which when applied to a display means causes text corresponding to said found name to be visible; and displaying said found name upon said display means.

101. The method of claim 100, wherein the first dimension is a vertical dimension of said display means.

102. The method of claim 100, wherein the second dimension is a horizontal dimension of said display means.

103. The method of claim 100, wherein the two-dimensional arrangement includes classification information for at least a portion of said plurality of television programs.

104. The method of claim 100, wherein the two-dimensional arrangement includes a recording indicator that indiates that a television program identified by the recording indicator is to be recorded.

105. The method of claim 100, wherein the two-dimensional arrangement includes a directional indicator indicating that more television schedule information is available to be displayed in a portion of the two-dimensional arrangement indicated by the directional indicator.

106. The method of claim 100, further comprising displaying on said display means, the selected program identified by the user.

107. The method of claim 100, further comprising recording the selected program identified by the user.

108. The method of claim 107, wherein the recording is based upon a scheduled time of broadcast of the selected program.

109. The method of claim 107, wherein the recording is based upon a receipt of an identifying signal that indicates that the selected program is currently being broadcast.

110. The method of claim 100, further comprising tuning said television receiver to the selected program identified by the user.

111. The method of claim 100, further comprising displaying details relating to the selected program identified by the user.

112. The method of claim 111, wherein the details include a description of the selected program identified by the user.

113. The method of claim 100, wherein said identifying signals are received with said plurality of television programs currently available for reception.

114. The method of claim 100, wherein the signals indicating the channel on which each of said plurality of television programs can be received are received with said plurality of television programs currently available for reception.

115. A television receiver comprising:

a television program signal receiver for receiving a television program signal;

means for detemining the channel to which said receiver is tuned;

means for receiving identifying signals representative of the names of a plurality of television programs currently available for reception and the channel on which each of said plurality of television programs can be received;

means for processing said identifying signals to find the name of one of the plurality of television programs currently available for reception that is associated with said determined channel, and for causing to be displayed:

a two-dimensional arrangement of television schedule information including multiple times, titles, and multiple channels for at least a portion of said plurality of televison programs, wherein the multiple times are indicated in a substantially linear fashion along a first dimension of the two-dimensional arrangement and wherein the multiple channels are indicated in a substantially linear fashion along a second dimension of the two-dimensional arrangement, and an indicator that indicates selection of a program in the two-dimentional arrangement in response to input from a user; and display means adapted to display said found name on command from the user.

116. The television receiver of claim 115, wherein the first dimension is a vertical dimension of said display means.

117. The television receiver of claim 115, wherein the second dimension is a horizontal dimension of said display means.

118. The television receiver of claim 115, wherein the two-dimensional arrangement includes classification information for at least a portion of said plurality of televison programs.

119. The television receiver of claim 115, wherein the two-dimensional arrangement includes a recording indicator that indicates that a television program identified by the recording indicator is to be recorded.

120. The television receiver of claim 115, wherein the two-dimensional arrangement includes a directional indicator indicating that more television schedule information is available to be displayed in a portion of the two-dimensional arrangement indicated by the directional indicator.

121. The television receiver of claim 115, wherein the means for processing also causes the selected program identified by the user to be displayed on the display means.

122. The television receiver of claim 115, wherein the means for processing also causes the selected program identified by the user to be recorded.

123. The televison receiver of claim 122, wherein recording is based upon a scheduled time of broadcast of the selected program.

124. The televison receiver of claim 122, wherein recording is based upon a receipt of an identifying signal that indicates that the selected program is currently being broadcast.

125. The television receiver of claim 115, wherein the television program signal receiver tunes to the selected program identified by the user.

126. The television receiver of claim 115, wherein the means for processor and for causing causes to be displayed details relating to the selected program identified by the user.

127. The television receiver of claim 126, wherein the details include a description for the selected program identified by the user.

128. The television receiver of claim 115, wherein the means for receiving receives said identifying signals with said plurality of television programs currently available for reception.

* * * * *